US012793971B2

(12) United States Patent
Kampmann et al.

(10) Patent No.: US 12,793,971 B2
(45) Date of Patent: Nov. 10, 2026

(54) ANODE FOR A MAGNESIUM BATTERY AND METHOD FOR THE PRODUCTION THEREOF

(71) Applicant: Schaeffler Technologies AG & Co. KG, Herzogenaurach (DE)

(72) Inventors: Felix Kampmann, Karlsruhe (DE); Jürgen Remmlinger, Karlsruhe (DE); Ladislaus Dobrenizki, Höchstadt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 713 days.

(21) Appl. No.: 18/016,023

(22) PCT Filed: Jul. 5, 2021

(86) PCT No.: PCT/DE2021/100582
§ 371 (c)(1),
(2) Date: Jan. 13, 2023

(87) PCT Pub. No.: WO2022/012715
PCT Pub. Date: Jan. 20, 2022

(65) Prior Publication Data

US 2023/0223543 A1 Jul. 13, 2023

(30) Foreign Application Priority Data

Jul. 15, 2020 (DE) ......................... 102020118666.5

(51) Int. Cl.
*H01M 4/46* (2006.01)
*H01M 4/04* (2006.01)
(Continued)

(52) U.S. Cl.
CPC ......... *H01M 4/466* (2013.01); *H01M 4/0404* (2013.01); *H01M 4/0428* (2013.01);
(Continued)

(58) Field of Classification Search
CPC .. H01M 2004/027; H01M 4/466; H01M 4/66; H01M 4/661; H01M 4/669;
(Continued)

(56) References Cited

U.S. PATENT DOCUMENTS 4,411,748 A 10/1983 Harvey
2011/0183156 A1 7/2011 Song
(Continued)

FOREIGN PATENT DOCUMENTS

CN 110858638 A 3/2020
JP H11345610 A 12/1999
(Continued)

OTHER PUBLICATIONS

Tina Chen et al. "Evaluation of Mg compounds as coating materials in Mg batteries", arx1x.org, Cornell University Library, 201 Olin Library Cornell University Ithaca, NY 14853, Feb. 5, 2019 (Feb. 5, 2019).

(Continued)

*Primary Examiner* — Laura Weiner
(74) *Attorney, Agent, or Firm* — Volpe Koenig

(57) ABSTRACT

An anode for a magnesium battery, including a core element made from a core material, wherein a magnesium coating is at least partially arranged on a surface of the core element, a protective layer being arranged on a surface of the magnesium coating. A method for producing such an anode and a magnesium battery having at least one such anode are also provided.

10 Claims, 1 Drawing Sheet

(51) Int. Cl.
*H01M 4/66* (2006.01)
*H01M 4/02* (2006.01)
*H01M 10/054* (2010.01)

(52) U.S. Cl.
CPC ............. *H01M 4/66* (2013.01); *H01M 4/661* (2013.01); *H01M 4/669* (2013.01); *H01M 2004/027* (2013.01); *H01M 10/054* (2013.01)

(58) Field of Classification Search
CPC .. H01M 4/366; H01M 4/0404; H01M 4/0428; H01M 10/054
See application file for complete search history.

(56) References Cited

U.S. PATENT DOCUMENTS

| | | | |
|---|---|---|---|
| 2016/0254541 | A1 | 9/2016 | Kim et al. |
| 2018/0190981 | A1 | 7/2018 | Ban et al. |
| 2020/0112028 | A1 | 4/2020 | Arthur et al. |

FOREIGN PATENT DOCUMENTS

| | | | | |
|---|---|---|---|---|
| JP | 2000012016 | A | | 1/2000 |
| JP | 2012531725 | A | | 12/2012 |
| JP | 2013168351 | A | | 8/2013 |
| JP | 2014143191 | X | | 8/2014 |
| JP | 2019186026 | A | | 10/2019 |
| JP | 2020-35596 | | * | 3/2020 |
| NL | 741254 | A | | 5/1975 |
| WO | 2017156130 | | | 9/2017 |

OTHER PUBLICATIONS

Ruijing Lyl't et al. "Enabling Mg metal anodes rechargeable in conventional electrolytes by fast ionic transport interphase" Research Article, National Science Review 7, pp. 333-341, Oct. 21, 2019.

* cited by examiner

ANODE FOR A MAGNESIUM BATTERY AND METHOD FOR THE PRODUCTION THEREOF

CROSS-REFERENCE TO RELATED APPLICATIONS

This application is the U.S. National Phase of PCT Appln. No. PCT/DE2021/100582, filed Jul. 5, 2021, which claims the benefit of German Patent Appln. No. 102020118666.5, filed Jul. 15, 2020, the entire disclosures of which are incorporated by reference herein.

TECHNICAL FIELD

The disclosure relates to an anode for a magnesium battery and a method for the production of an anode for a magnesium battery. A magnesium battery is an electrochemical storage device, the anode of which is essentially made of magnesium.

BACKGROUND

US 2020/0112028 A1 discloses an anode for a magnesium battery. The anode is formed from a magnesium foam and has a polymer layer, which covers the magnesium foam on all surfaces.

US 2016/0254541 A1 describes an electrode active material for a magnesium battery containing a λ-$MnO_2$ phase.

US 2018/0190981 A1 discloses a device having a first electrode made of metallic magnesium and a coating comprising a first polymer.

JP 2014 143 191 A describes a magnesium battery having a negative electrode comprising magnesium, a positive electrode comprising copper or a copper alloy, and an electrolyte comprising citric acid, sodium chloride, and water. The side of the negative electrode facing away from the positive electrode is coated with a coating, which comprises tin.

It is generally known that magnesium batteries generally comprise multiple battery cells, wherein a respective battery cell has multiple anodes and cathodes, which are arranged in an electrolyte. During operation of the magnesium battery, a boundary layer forms on the magnesium anode between the electrolyte and the magnesium anode, which reduces the service life and performance, in particular the impedance and cycle stability of the magnesium battery. This boundary layer can form as soon as the magnesium anode is exposed to ambient air.

SUMMARY

The object of the disclosure is to provide a long-life anode for a magnesium battery. Furthermore, the anode should be inexpensive to produce and increase the performance of the magnesium battery. The object is achieved by an anode with one or more of the features described herein. Preferred embodiments can be found in the claims, the description and the figures.

An anode for a magnesium battery according to the disclosure comprises a core element made from a core material, wherein a magnesium coating is at least partially arranged on a surface of the core element, wherein a protective layer is arranged on a surface of the magnesium coating, and wherein the protective layer is either designed as metallic and is formed from one of the following elements: aluminum, copper, silicon, titanium, tantalum, niobium, nickel, molybdenum, silver, or consists of an alloy of at least two of the following elements: aluminum, copper, tin, silicon, titanium, tantalum, niobium, nickel, molybdenum, silver, or designed as ceramic and consists of elements from the group comprising aluminum, copper, tin, silicon, titanium, tantalum, niobium, nickel, molybdenum, silver, carbon, nitrogen, oxygen, or the protective layer consists of metal sulfide, wherein at least one of the following elements from the group comprising aluminum, copper, tin, silicon, titanium, tantalum, niobium, nickel, molybdenum, silver, forms the metal sulfide, or the protective layer consists of carbon or doped carbon.

In other words, at least a part of the surface of the core element or the entire surface of the core element is coated with the magnesium coating, wherein the magnesium of the magnesium coating preferably has a purity of at least 99.9%. The magnesium coating is the active material of the anode. The active material is intended to interact with a cathode. The protective layer is arranged entirely on the surface of the magnesium coating. In particular, the protective layer is formed on the surface of the magnesium coating in such a manner that the electrolyte of the magnesium battery either has no direct, i.e. immediate, contact with the magnesium coating of the anode, but merely contacts the protective layer arranged on the surface of the magnesium coating or has a positive influence on the anode behavior due to an interaction with the magnesium coating. This has the advantage that no spontaneous boundary layer to the electrolyte is formed on the magnesium coating, which reduces the service life and performance, in particular the impedance and cycle stability of the magnesium battery. In particular, the protective layer protects the magnesium coating from oxidation during production. Furthermore, the protective layer enables a reduction of the interfacial resistance as well as an improvement of the kinetics of dissolution and deposition processes. Furthermore, the protective layer optimizes the cyclability of the anode.

To achieve these benefits, the protective layer is designed as metallic and formed from preferably one of the following elements: aluminum, copper, silicon, titanium, tantalum, niobium, nickel, molybdenum, silver. Alternatively, the protective layer is formed from an alloy of at least two of the following elements: aluminum, copper, tin, silicon, titanium, tantalum, niobium, nickel, molybdenum, silver.

For example, the protective layer is formed from aluminum or an aluminum alloy. For example, the protective layer is formed from copper or a copper alloy. For example, the protective layer is formed from a tin alloy. For example, the protective layer is formed from silicon or a silicon alloy. For example, the protective layer is formed from titanium or a titanium alloy. For example, the protective layer is formed from tantalum or a tantalum alloy. For example, the protective layer is formed from niobium or a niobium alloy. For example, the protective layer is formed from nickel or a nickel alloy. For example, the protective layer is formed from molybdenum or a molybdenum alloy. For example, the protective layer is formed from silver or a silver alloy.

In an alternative embodiment, the protective layer is designed as ceramic and consists of elements from the group comprising aluminum, copper, tin, silicon, titanium, tantalum, niobium, nickel, molybdenum, silver, carbon, nitrogen, oxygen.

In particular, the ceramic protective layer is a metal oxide layer. For example, the protective layer is formed at least partially or entirely from aluminum oxide. For example, the protective layer is formed at least partially or entirely from copper oxide. For example, the protective layer is formed at least partially or entirely from tin oxide. For example, the protective layer is formed at least partially or entirely from silicon oxide. For example, the protective layer is formed at least partially or entirely from titanium oxide. For example, the protective layer is formed at least partially or entirely from tantalum oxide. For example, the protective layer is formed at least partially or entirely from niobium oxide. For example, the protective layer is formed at least partially or entirely from nickel oxide. For example, the protective layer is formed at least partially or entirely from molybdenum oxide. For example, the protective layer is formed at least partially or entirely from silver oxide.

In a further preferred embodiment, the ceramic protective layer is formed from a carbide and/or nitride compound. For example, the protective layer is formed at least partially or entirely from silicon nitride. For example, the protective layer is formed at least partially or entirely from titanium nitride. For example, the protective layer is formed at least partially or entirely from niobium nitride. For example, the protective layer is formed at least partially or entirely from tantalum nitride.

In a further alternative embodiment, the protective layer consists of metal sulfide, wherein at least one of the following elements selected from the group comprising aluminum, copper, tin, silicon, titanium, tantalum, niobium, nickel, molybdenum and silver, forms the metal sulfide. For example, the protective layer is formed at least partially or entirely from molybdenum sulfide.

According to a further preferred embodiment, the protective layer can comprise sulfide and/or nitride compounds.

In a further alternative embodiment, the protective layer consists of carbon or doped carbon. The doping of the doped carbon layer, i.e. the protective layer formed largely from carbon, amounts to a maximum of 45 atom %. Preferably, one or more elements from the group comprising aluminum, copper, tin, silicon, titanium, tantalum, niobium, nickel, molybdenum, silver, hydrogen, are used here as doping element(s).

According to a preferred embodiment, the protective layer has a layer thickness of at least 0.5 nm and at most 5 μm. In particular, it has been found that a layer thickness of the protective layer of at least 5 nm and at most 250 nm contributes particularly well to maintaining an energy density of the anode.

Preferably, the core element, which is also known as the conductor, is formed at least partially from aluminum, copper, steel or a polymer material. For example, the core element is formed from aluminum or an aluminum alloy. For example, the core element is formed from copper or a copper alloy. For example, the core element is formed from steel or a steel alloy. In particular, the steel alloy is a stainless steel, i.e. a steel whose degree of purity is such that a sulfur and phosphorus content is at most 0.025 wt %. In particular, the steel alloy is corrosion resistant and has at least chromium and/or nickel as alloying elements. The alloy composition of the steel alloy can be determined, for example, by spectral analysis (OES) or by X-ray fluorescence analysis (XRF). wt % is the abbreviation for weight percent.

The following method steps are carried out to produce an anode according to the disclosure: First, a core element is provided. The core element is preferably formed from a core material of aluminum, copper, steel or a polymer material. This is followed by the application of a magnesium coating to at least a part of a surface of the core element. This is followed by the application of a protective layer to the surface of the magnesium coating.

According to a preferred embodiment of the disclosure, the magnesium coating is applied to at least a part or all of the surface of the core element by means of a galvanic process, lamination process, PVD process, CVD process, ALD process, plating process, thermal spraying process, or melting process.

The magnesium coating preferably has a layer thickness in a range of 50 nm to 200 μm, in particular 1 μm to 50 μm.

In galvanic processes, the electrochemistry electrolytic of magnesium on the core element takes place in an deposition bath, for example. In lamination processes, coated material, for example the magnesium coating and the protective layer, is transferred or laminated onto a structured core element. In plating processes, also known as cladding, metal layers are formed on the substrate or core element by pressure and temperature, and in particular also by subsequent heat treatment. In thermal spraying processes, liquefied magnesium is sprayed onto the substrate, i.e. the core element.

PVD is the abbreviation for the term "Physical Vapor Deposition". The PVD process is a process carried out under vacuum and at temperatures ranging from 150° C. to 500° C. Physical processes are used to convert the starting material for the magnesium coating into the gas phase. The gaseous material is then directed to the surface of the core element, where it condenses and forms the magnesium coating. For example, in the PVD process, particles are extracted from a magnesium target by sputtering and transported to the surface of the core element in a plasma. PVD processes can be used to produce particularly pure and homogeneous coatings.

CVD is the abbreviation for the term "Chemical Vapor Deposition". In the CVD process, layer deposition occurs on the heated surface of the core element due to a chemical reaction from a gas phase. The CVD process is characterized by at least one reaction on the surface of the core element. This reaction involves at least one gaseous starting compound and at least two reaction products, wherein at least one of them is in the solid phase. CVD processes can be used to produce particularly uniform coatings.

ALD is the abbreviation for the term "Atomic Layer Deposition". The ALD process is a highly modified CVD process with at least two cyclically performed self-limiting surface reactions. The material to be deposited is bound in chemical form to one or more carrier gases. The carrier gases are alternately fed into a reaction chamber where they are caused to react with the surface of the core element, whereupon the magnesium bound in the gas is deposited on the surface of the core element. ALD processes can be used to produce particularly thin coatings.

In the melting process, the magnesium is melted and applied to the core element by dipping or spraying, for example. Melting processes offer not only a cost advantage, but also the advantage of forming a fast as well as large-area coating.

According to a preferred embodiment of the disclosure, the protective layer is applied to the entire surface of the magnesium coating by a PVD process, CVD process or ALD process.

It is also possible to coat the protective layer onto a magnesium foil, which is then applied to the core element. The magnesium foil is preferably produced using a rolling process.

According to a preferred embodiment of the disclosure, the protective layer is applied to the surface of the magnesium coating during operation of the anode. In other words, the battery cell is designed in such a manner that a protective layer is produced on the magnesium coating of the anode during operation of the magnesium battery, which protects the magnesium coating from oxidation, optimizes the cyclability of the anode, enables a reduction of the interfacial resistance and an improvement of the kinetics of dissolution and deposition processes. For example, the electrolyte is formed in such a manner that one of the following elements is deposited as a protective layer on the magnesium coating of the anode: aluminum, copper, silicon, titanium, tantalum, niobium, nickel, molybdenum, silver. Alternatively, an alloy of at least two elements from the group comprising aluminum, copper, tin, silicon, titanium, tantalum, niobium, nickel, molybdenum, silver, is deposited.

Furthermore, the disclosure relates to a magnesium battery comprising an anode according to the disclosure. In particular, the magnesium battery has multiple battery cells, wherein each battery cell has multiple anodes and cathodes, which are arranged in a liquid electrolyte or solid electrolyte.

A cathode made of a cathode material containing a sulfur component has proven suitable together with the anode according to the disclosure. $V_2O_5$ or $MgMn_2O_4$ have proven to be particularly suitable as base materials for an intercalation reaction to form the cathode. As base materials for a conversion reaction to form the cathode, sulfur-infiltrated carbon, sulfur-carbon compounds or SPAN (sulfurized poly (acrylonitrile)) have proven to be particularly suitable.

For the formation of an electrolyte for the magnesium battery, electrolyte salts, such as the following, have proven themselves suitable $MgTFSI_2$ Magnesium bis(trifluoromethanesulfonimide)

$Mg(B(hfip)_4)_2$ Magnesium tetrakis(hexafluoroisopropyloxy)borate $Mg(BH_4)_2$ Magnesium borohydride Also, mixtures of $Mg(BH_4)_2$ and $Li(BH_4)$ (=lithium borohydride) or of $Mg(B(hfip)_4)_2$ and $Li(B(hfip)_4)$ (=lithium tetrakis(hexafluoroisopropyloxy)borate) have been shown to enhance performance.

Furthermore, the use of electrolyte salts based on $Mg(HMDS)_2$ (=magnesium bis(hexamethyldisilazide)) has proven suitable.

Glymes, in particular TEG (=tetraethylene glycol dimethyl ether, tetraglyme), DEG (=diethylene glycol dimethyl ether, diglyme), DME (=1,2-dimethoxyethane, ethylene glycol dimethyl ether, monoglyme), or a mixture of TEG and DME, haven proven to be a suitable solvent for dissolving the electrolyte salts.

Other proven solvents are THF (tetrahydrofuran) or ionic liquids such as $Pyr_{14}TFSI$ (=1-butyl-1-methylpyrrolidinium bis(trifluoromethylsulfonyl)imide).

BRIEF DESCRIPTION OF THE DRAWINGS

Further measures improving the disclosure are shown in more detail below together with the description of a preferred exemplary embodiment based on the two figures, wherein the same elements are provided with the same reference numeral. In the figures.

DETAILED DESCRIPTION

Figure 1:
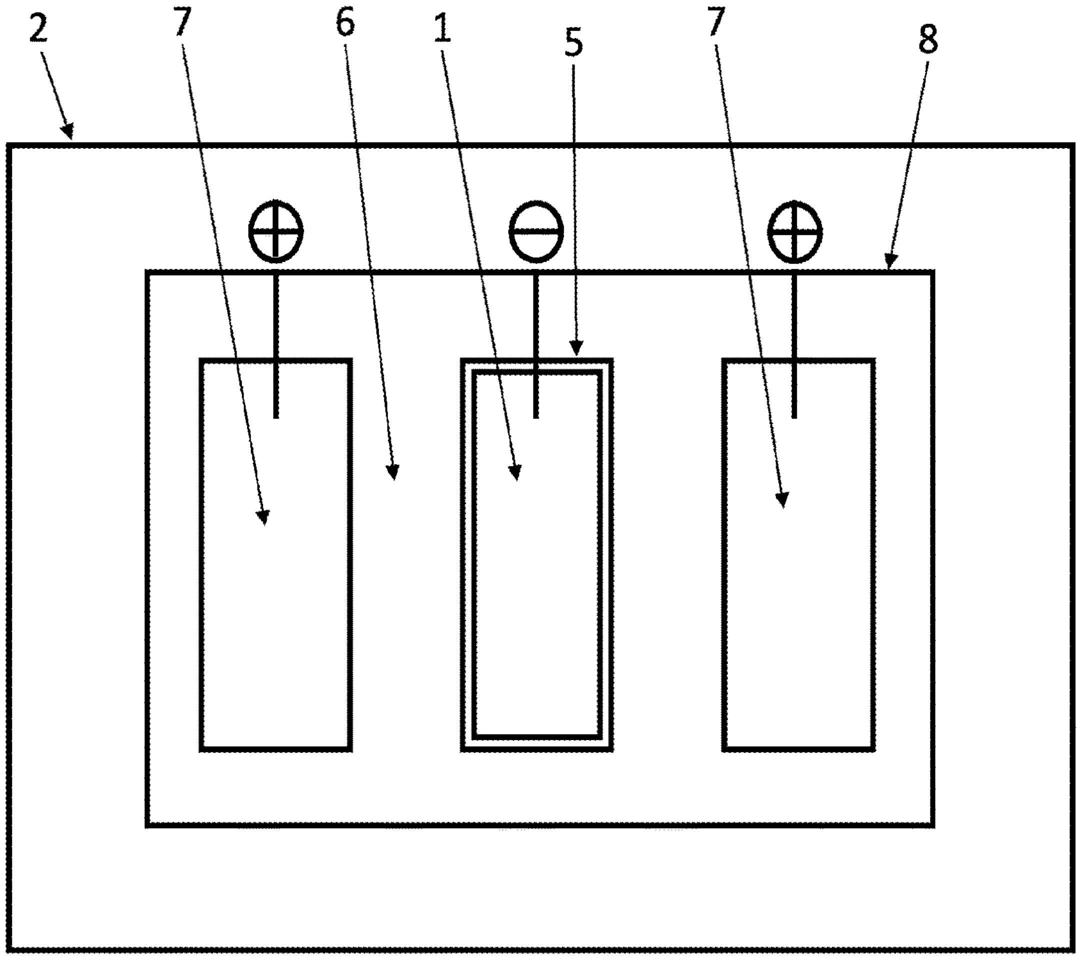
FIG. 1 shows a highly simplified schematic sectional view of a magnesium battery according to the disclosure, which is only partially shown.

FIG. 1 shows a magnesium battery 2 according to the disclosure in a highly simplified manner. The magnesium battery 2 has multiple battery cells 8, wherein only a part of a single battery cell 8 is shown herein for reasons of simplicity. The battery cell 8 has multiple anodes 1 and cathodes 7, which are arranged in an electrolyte 6. A surface of the respective anode 1 is fully covered with a protective layer 5.

Figure 2:
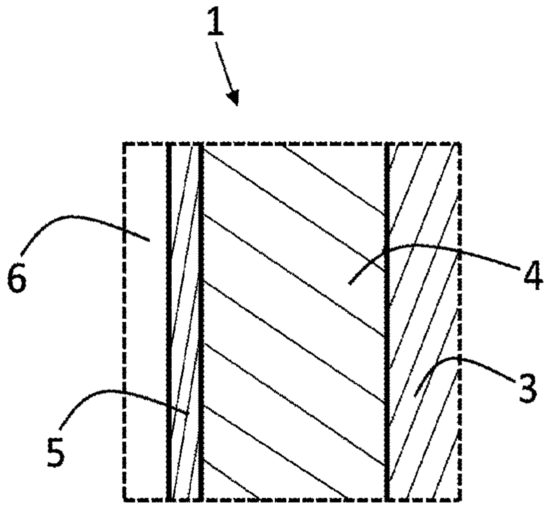
FIG. 2 shows a highly simplified schematic sectional view of an anode according to the disclosure, which is only partially shown.

FIG. 2 shows a section of the anode 1 according to FIG. 1. The anode 1 has a core element 3, which is formed from the core material aluminum here. A magnesium coating 4 is arranged on a surface of the core element 3 as the active material of the anode 1, wherein the magnesium coating 4 was formed, for example, by a melting process. The protective layer 5 is arranged on a surface of the magnesium coating 4. For example, the protective layer 5 is metallic and formed from aluminum or is ceramic and formed from a copper oxide. In particular, the PVD process is suitable for forming the protective layer 5. The protective layer 5 preferably has a layer thickness of at least 0.5 nm and at most 5 μm. The electrolyte 6 is not adjacent to the magnesium coating 4, but only to the protective layer 5. This increases the longevity of the anode 1 and enhances the performance of the magnesium battery 2.

LIST OF REFERENCE NUMERALS

1 Anode
2 Magnesium battery
3 Core element
4 Magnesium coating
5 Protective layer
6 Electrolyte
7 Cathode
8 Battery cell

The invention claimed is:

1. An anode for a magnesium battery, comprising:
a core element made from a core material, the core material comprising at least one material selected from the group consisting of aluminum, copper, and steel, and the core element being a conductor;
a magnesium coating at least partially arranged on a surface of the core element as an active material of the anode; and
a protective layer arranged on a surface of the magnesium coating, the protective layer comprising a ceramic protective layer comprising a metal oxide layer comprising tin oxide.

2. The anode according to claim 1, wherein the protective layer has a layer thickness of at least 0.5 nm and at most 5 μm.

3. The anode according to claim 1, wherein the magnesium coating has a layer thickness in a range of 50 nm to 200 μm.

4. A magnesium battery comprising:
at least one anode according to claim 1, at least one cathode comprising a cathode active material containing a sulfur component and an electrolyte comprising a solid or liquid electrolyte.

5. An anode for a magnesium battery, comprising:
a core element formed as a conductor, the core element comprises a core material formed from at least one material selected from the group consisting of aluminum, copper, and steel;
a magnesium coating at least partially arranged on a surface of the core element as an active material of the anode; and
a ceramic protective layer arranged on a surface of the magnesium coating, the ceramic protective layer being a metal oxide layer comprising oxygen and at least one element selected from the group consisting of aluminum, copper, tin, silicon, titanium, tantalum, niobium, nickel, molybdenum, and silver.

6. The anode according to claim 5, wherein the ceramic protective layer has a layer thickness of at least 0.5 nm and at most 5 μm.

7. The anode according to claim 5, wherein the magnesium coating has a layer thickness in a range of 50 nm to 200 μm.

8. A method for producing an anode for a magnesium battery, the method comprising:

providing a core element made from a core material, the core material comprising at least one material selected from the group consisting of aluminum, copper, and steel, and the core element being a conductor;

applying a magnesium coating to at least a part of a surface of the core element, the magnesium coating being an active material of the anode; and applying a protective layer to the surface of the magnesium coating, the protective layer comprising a ceramic protective layer comprising a metal oxide layer comprising tin oxide.

9. The method according to claim 8, wherein the magnesium coating is applied to at least the part of the surface of the core element by a galvanic process, lamination process, PVD process, CVD process, ALD process, plating process, thermal spraying process or melting process.

10. The method according to claim 8, wherein the protective layer is applied to the surface of the magnesium coating by a PVD process, CVD process, or ALD process.

* * * * *